JACOB GREEN.
Improvement in Gas-Burning Furnaces.
No. 115,193.      Patented May 23, 1871.
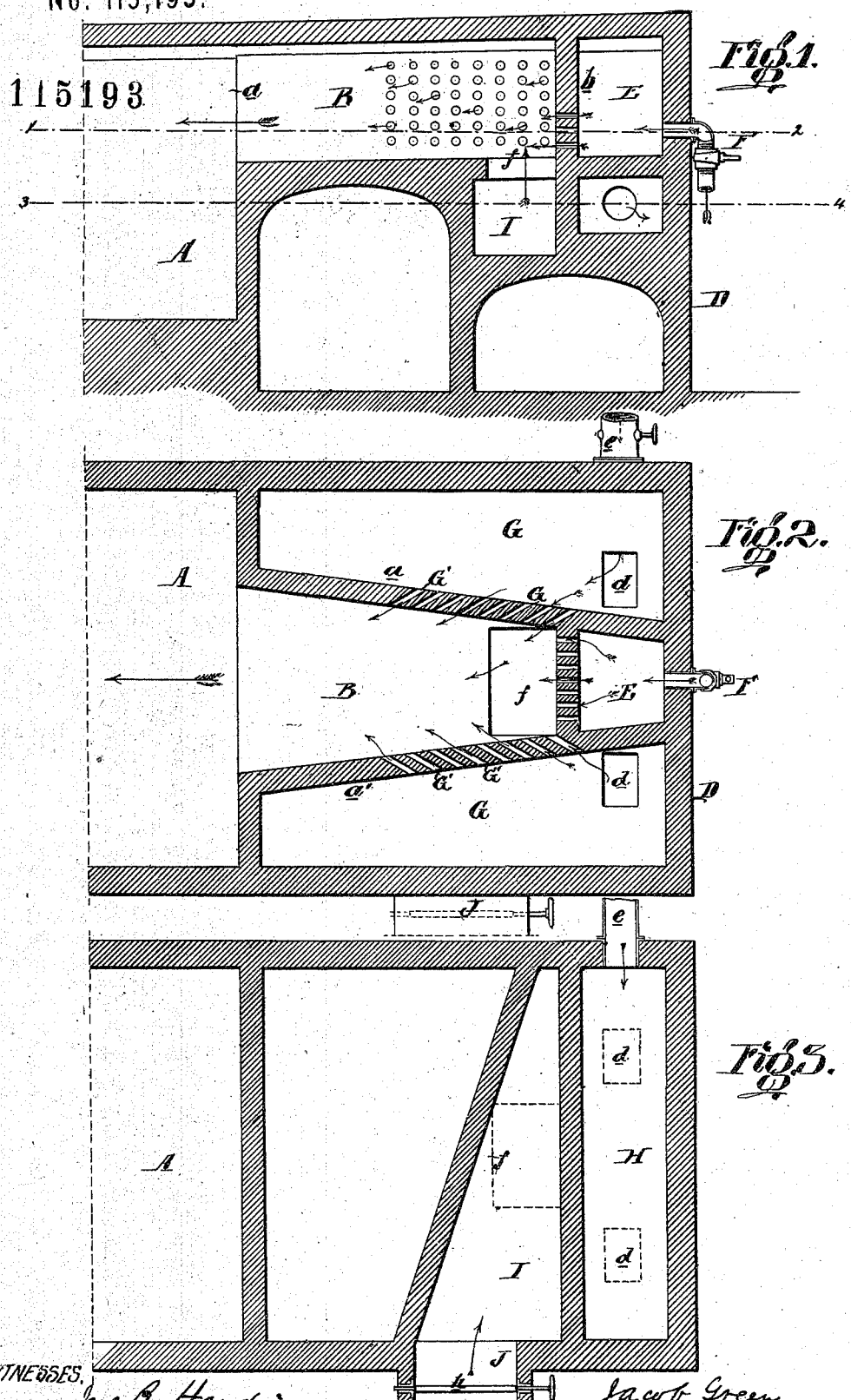

115,193

UNITED STATES PATENT OFFICE.

JACOB GREEN, OF PHILADELPHIA, PENNSYLVANIA.

IMPROVEMENT IN GAS-BURNING FURNACES.

Specification forming part of Letters Patent No. 115,193, dated May 23, 1871.

I, JACOB GREEN, of Philadelphia, county of Philadelphia, State of Pennsylvania, have invented a Gas-Burning Attachment for Furnaces, of which the following is a specification:

Nature and Object of the Invention.

My invention consists of a structure, too fully described hereafter to need preliminary explanation, to be attached to a furnace for the effective burning therein of combustible gases.

Description of the Accompanying Drawing.

Figure 1 is a vertical section of sufficient of a furnace to illustrate my invention; Fig. 2, a sectional plan on the line 1 2, Fig. 1; and Fig. 3, a sectional plan on the line 3 4, Fig. 1.

General Description.

My invention may be applied to and form a part of a puddling, glass, or other furnace.

A represents a portion of the furnace proper, and adjacent to and forming part of the same is the structure which constitutes my invention, and which I will now proceed to describe.

With the interior of the furnace A communicates a chamber, B, bounded on opposite sides by the walls $a$ $a'$, and at the end by a perforated partition, $b$, between which and the end wall D is a chamber, E, and with the latter communicates a steam-pipe, F, furnished with a suitable valve or cock. On each side of the chamber B is a chamber, G, which communicates, through passages $d$, with a chamber, H, and into the latter air is introduced through a pipe, $e$, furnished with an appropriate damper. The chamber B communicates through an opening, $f$, with a chamber, I, below, and into the latter are introduced, through a flue, J, combustible gases, the said flue being furnished with a damper, $h$.

As these gases pass upward through the opening $f$ into the chamber B, they are enveloped by and intimately mixed with jets of air passing or forced through the inclined perforations $G'$ in the walls $a$ $a'$. This intimate admixture of combustible gases and air, when ignited, results in an intensely-hot flame, which pervades the interior of the furnace A, and finally escapes through the chimney.

The air may be introduced in the form of a blast, the force of which can be regulated at pleasure, and the combustible gases may be derived from an adjacent gas-generating furnace.

A more intense heat may be imparted to the flame by admitting steam to the chamber E, jets of this steam passing through the perforated partition $b$, and becoming intimately mixed with the air and gases.

Claims.

1. The combination of the air-chambers G G, perforated walls $a$ $a'$, and mixing-chamber, the whole being arranged and applied to a furnace, substantially as set forth.

2. The combination of the above with the steam-chamber E and perforated wall $b$.

3. The combination of the lower chambers H and I with the upper chambers G G, E, and B, and communicating passages.

In testimony whereof I have signed my name to this specification in the presence of two subscribing witnesses.

JACOB GREEN.

Witnesses:
 WM. A. STEEL,
 J. RUPERTUS.